July 10, 1962 N. ACKERMAN 3,043,278
TURRET LATHE CONTROL
Filed July 16, 1956 8 Sheets-Sheet 1

INVENTOR.
NATHAN ACKERMAN
BY Abraham Friedman
Atty.

July 10, 1962

N. ACKERMAN 3,043,278

TURRET LATHE CONTROL

Filed July 16, 1956

INVENTOR.
NATHAN ACKERMAN
BY

INVENTOR.
NATHAN ACKERMAN
BY

July 10, 1962     N. ACKERMAN     3,043,278
TURRET LATHE CONTROL
Filed July 16, 1956          8 Sheets-Sheet 4
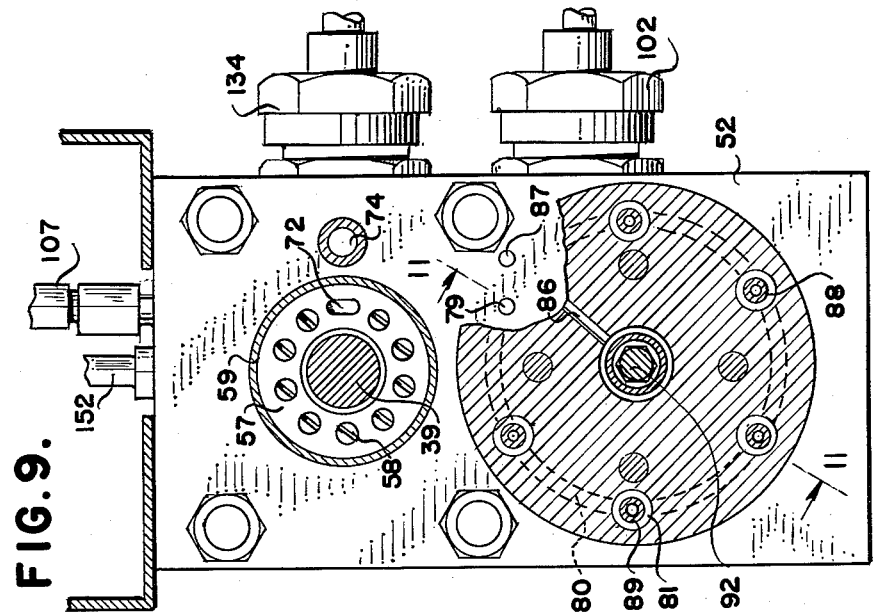
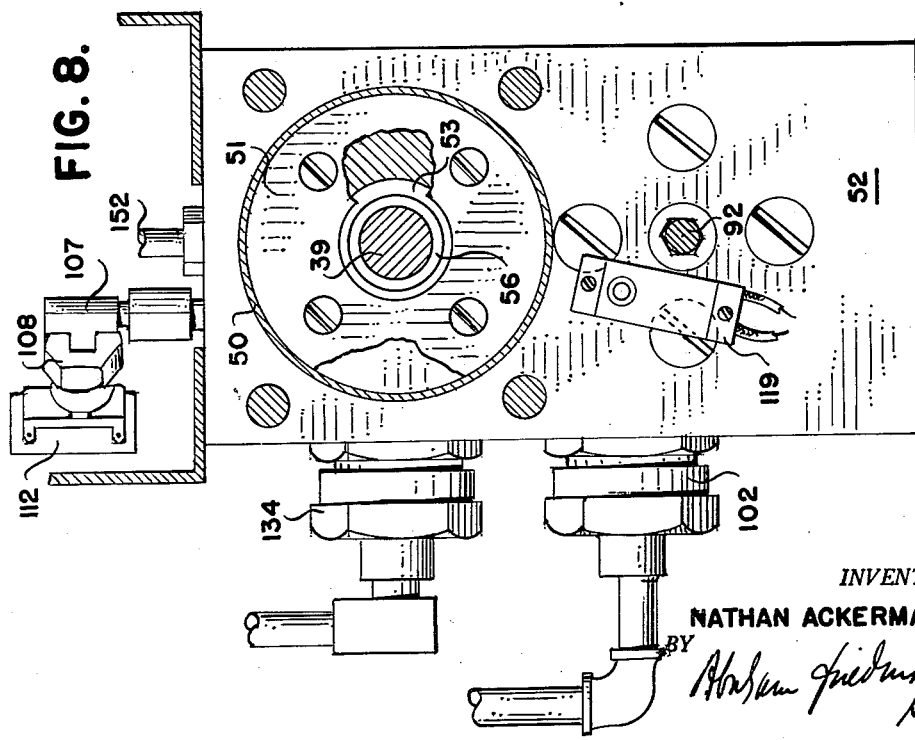
INVENTOR.
NATHAN ACKERMAN July 10, 1962 N. ACKERMAN 3,043,278
TURRET LATHE CONTROL
Filed July 16, 1956 8 Sheets-Sheet 5
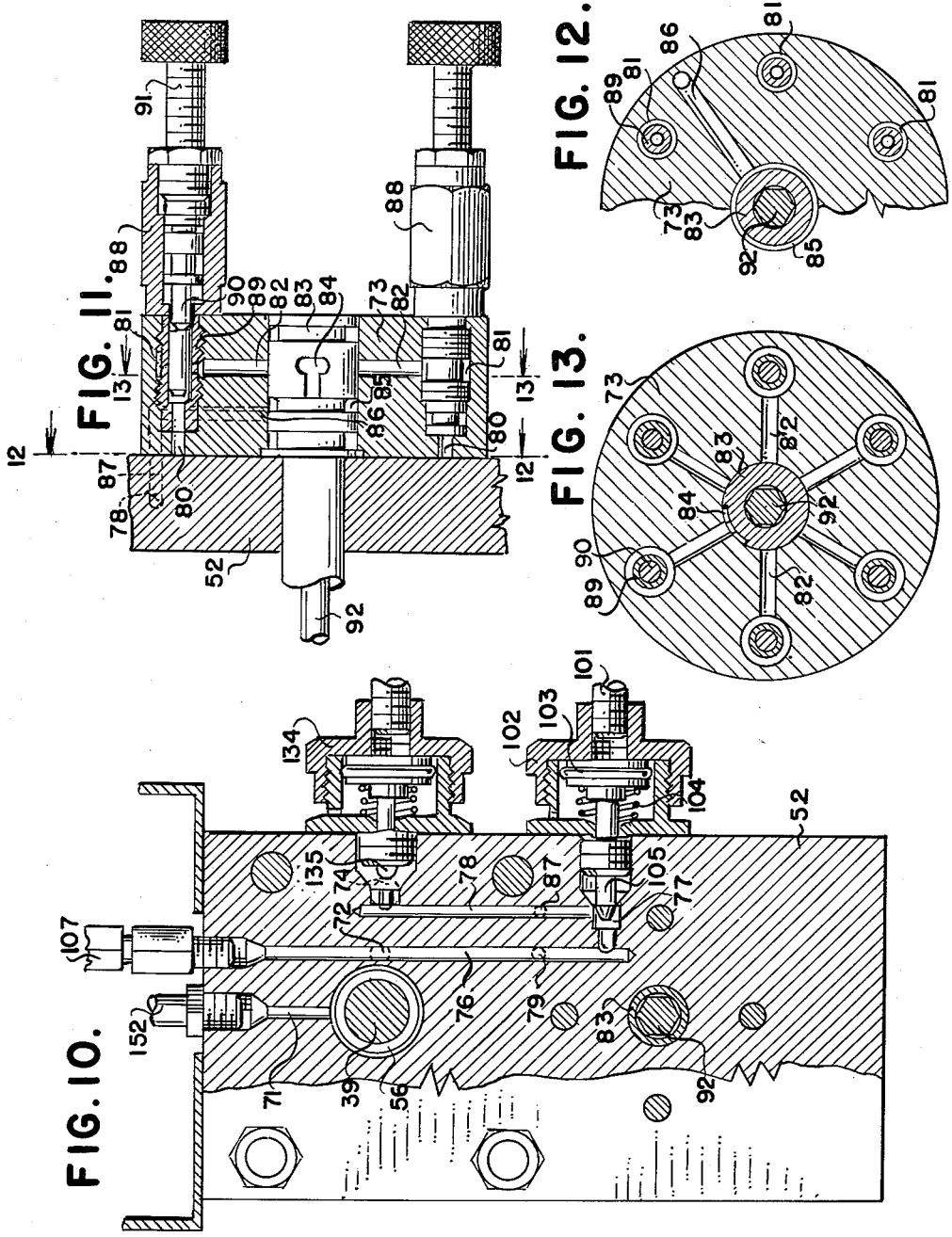
INVENTOR.
NATHAN ACKERMAN
BY
*Atty.*

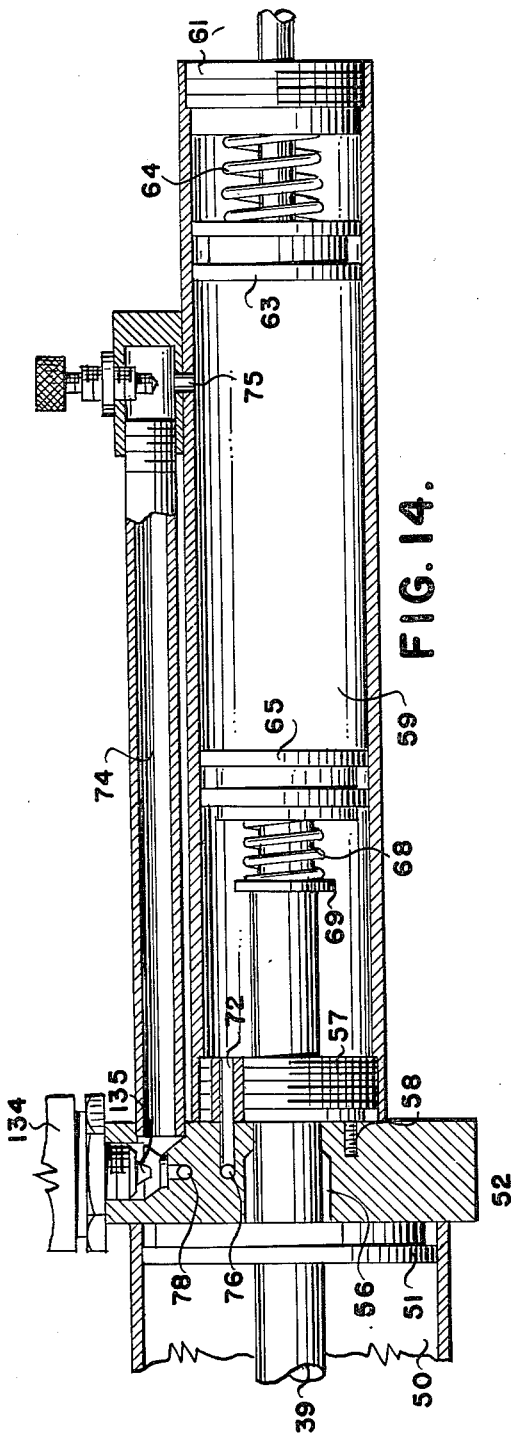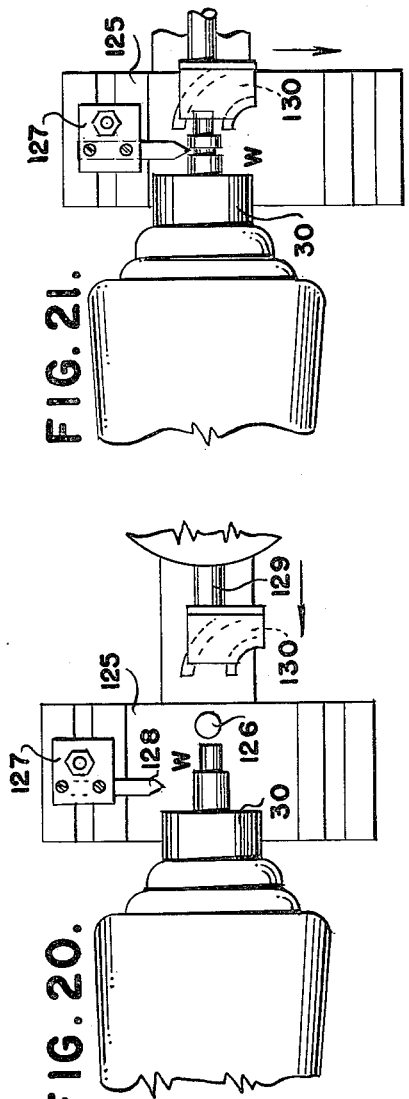

July 10, 1962 N. ACKERMAN 3,043,278
TURRET LATHE CONTROL
Filed July 16, 1956 8 Sheets-Sheet 7

INVENTOR.
NATHAN ACKERMAN
BY

INVENTOR.
NATHAN ACKERMAN
BY

United States Patent Office 3,043,278
Patented July 10, 1962

1

3,043,278
TURRET LATHE CONTROL
Nathan Ackerman, 4 Merrivale Terrace,
Lake Success, N.Y.
Filed July 16, 1956, Ser. No. 597,960
6 Claims. (Cl. 121—45)

The present invention relates to a novel mechanism for the control of a turret lathe, sometimes referred to as a screw machine. More particularly, it relates to a control mechanism which employs both compressed air and hydraulic fluid to control the rate of advance and return of the tool holder in accordance with a pre-set indexing pattern.

In working with automatic screw machines it is desirable that the tool be advanced rapidly from its starting location to a position immediately adjacent the workpiece since the tool during this movement is not active and no work is being performed. Once the tool contacts the workpiece, however, it is necessary that its rate of advance be slowed down so that the necessary preciseness can be achieved and so that neither the tool nor the workpiece will be damaged. On the return stroke it is once again desirable that the tool holder move rapidly since a slow return means wasted time.

Heretofore control mechanisms for screw machines have been provided which employ compressed air as the medium for advancing and returning the tool holder, regulation of the air supply serving to vary the speed during the different parts of the work cycle. While air is quite satisfactory for the rapid advance and for the rapid return, because of its compressibility it can not give the necessary degree of control required during the working portion of the cycle when the tool is in contact with the workpiece. Consequently, the use of compressed air increases the machine capacity at the expense of accuracy.

The use of a hydraulic fluid such as oil requires an excessive amount of fluid, a reservoir and special pumping equipment.

It is therefore an object of the present invention to provide a control mechanism for the turret of a scew machine, which mechanism permits careful control of the advance and return rates without loss of time or accuracy.

A further object of the invention is to provide a control mechanism which can be attached to existing screw machines without necessitating extensive modification of the screw machine.

Still another object of the invention is to provide a control mechanism which combines the advantages of rapid movement due to compressed air and careful controlled advance due to hydraulic fluid while avoiding the shortcomings of these media.

Yet another object of the invention is to provide the turret of a screw machine with a complete indexing and control mechanism permitting a complete work cycle to be performed automatically, including even cutting of the workpiece from a rod and release of the finished piece by the chuck.

These and other objects are realized in accordance with the present invention wherein the movement of the tool holder is controlled by a single piston rod carrying two piston heads, the first piston head working in a compressed air cylinder and the second working in an oil cylinder. When the screw machine is actuated, compressed air is fed behind the first piston head so that it

2 advances rapidly, air being vented from in front of the first piston head. Since the first and second piston heads move together, it is also necessary to permit the second piston head to move freely within the oil cylinder without being restrained. To this end, the second piston head is dragged along by the first and the oil in advance of the second piston head is pushed through a by-pass to return back of the second piston head.

When it is desired to have the tool holder advance slowly, the oil by-pass is closed off so that a small alternate passageway is the only path by which the oil in the oil cylinder can be displaced from in advance of the second piston head. Consequently, in spite of the urging of the compressed air on the first piston head, the piston rod can advance only as rapidly as the second piston head, the small alternate passageway serving as a brake. For returning the tool holder rapidly, the oil is prevented from braking the piston rod so that the compressed air is fully effective. By provision of suitable indexing means, the turret is automatically rotated to present the next tool and the sequence is automatically repeated through an entire cycle. If desired, however, the tool holder can be stopped or caused to stop automatically at any part of the cycle so that manual control may be afforded during a portion of the cycle. The rates of controlled advance can also be regulated in accordance with the particular operation being performed.

The invention will now be described more fully with reference to the accompanying drawings, wherein.

Figure 1:
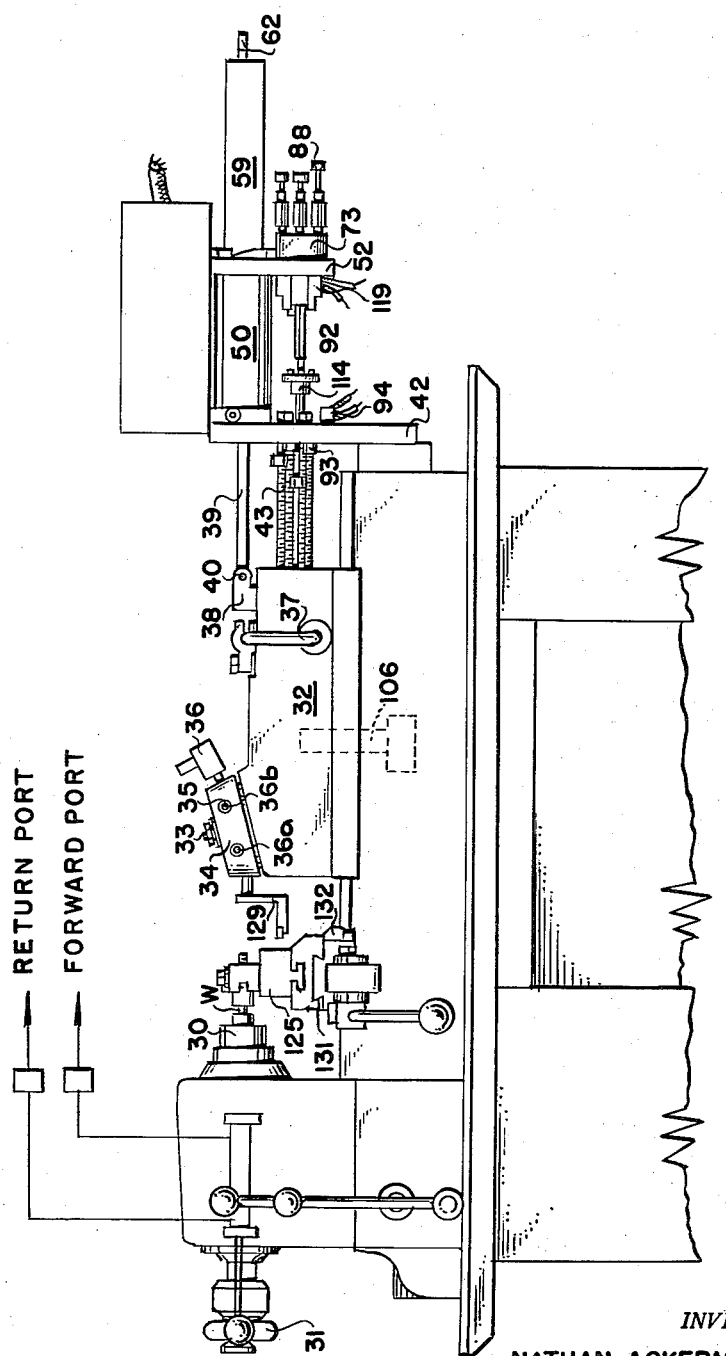
FIGURE 1 is an elevation of a screw machine having a turret governed by the control mechanism of the present invention, portions of the electrical wiring being moved for ease of illustration.
Figure 2:
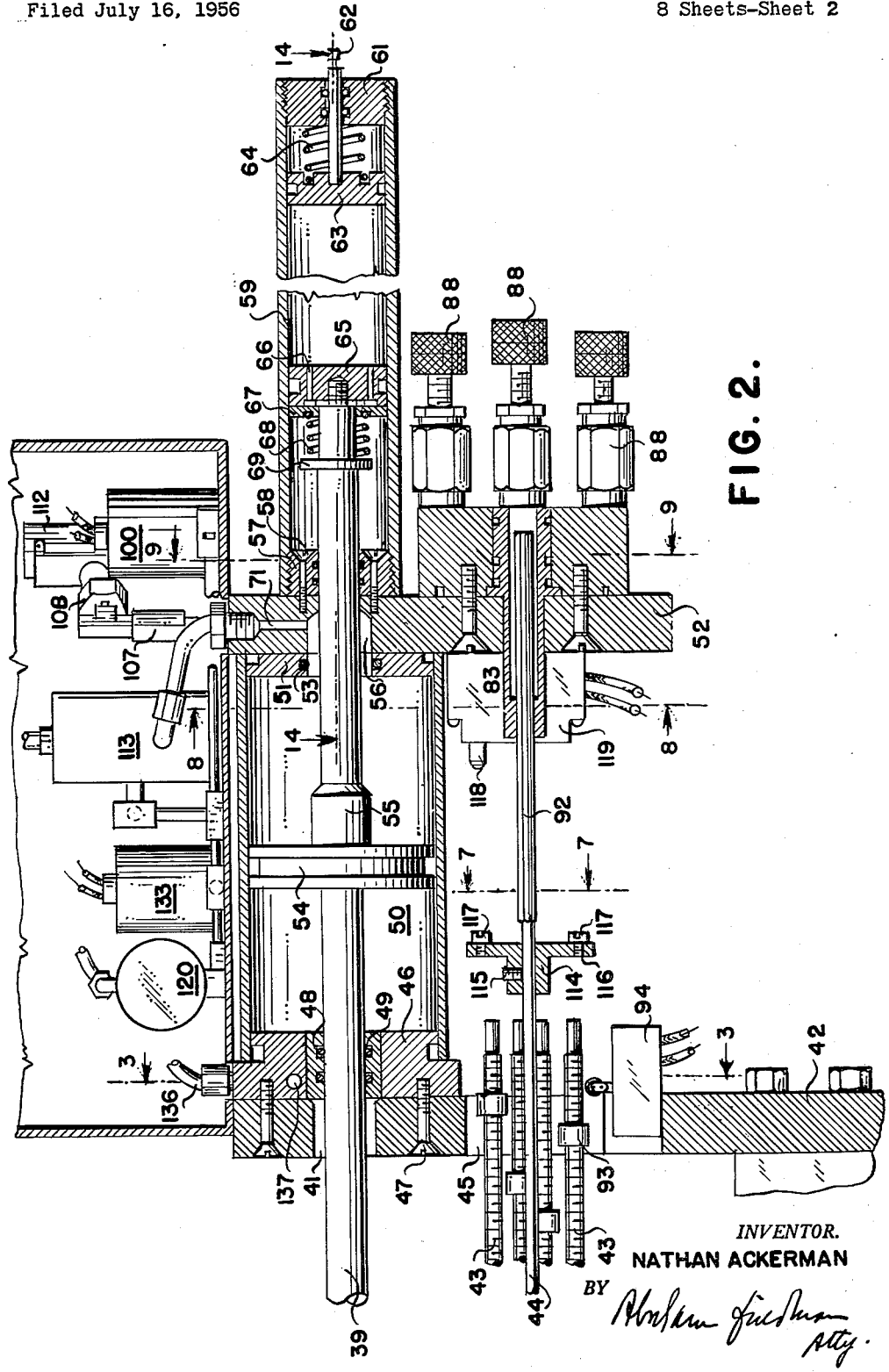
FIGURE 2 is a vertical section taken medially through the control mechanism of FIGURE 1, showing portions of the machine bed and slide member.
Figure 7:
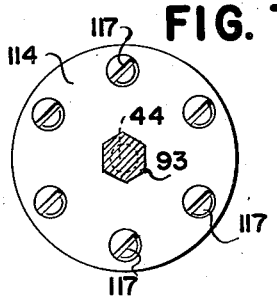
Figure 18:
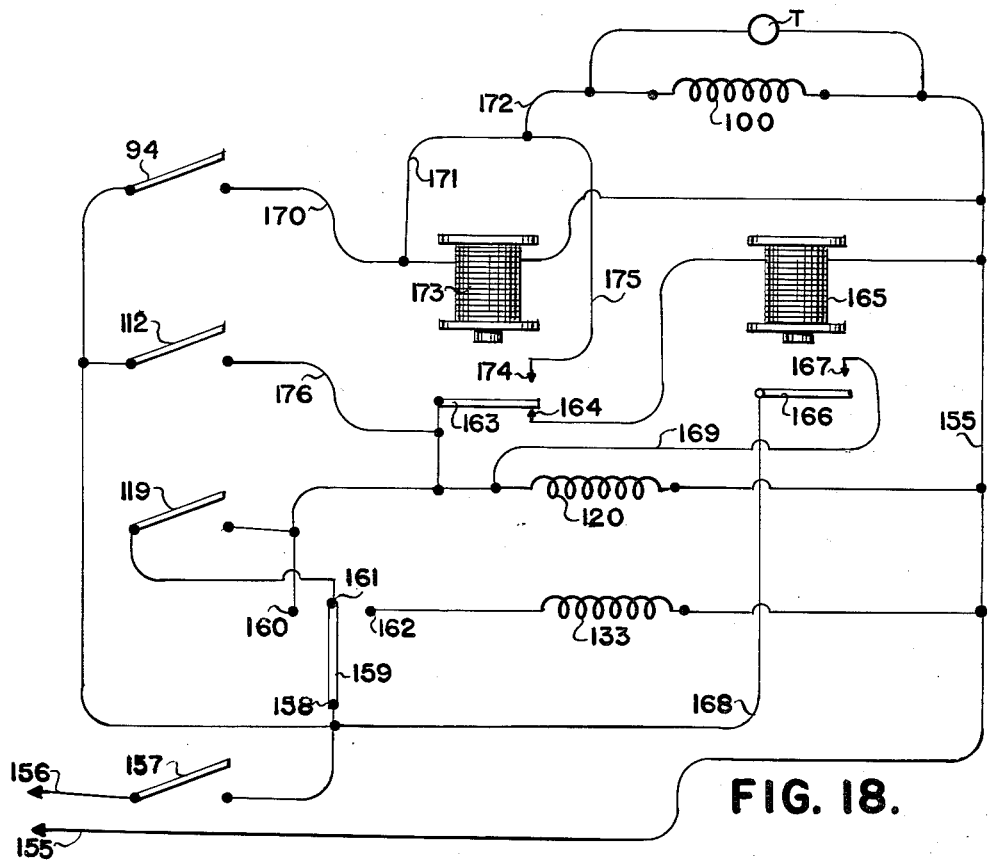
Figure 15:
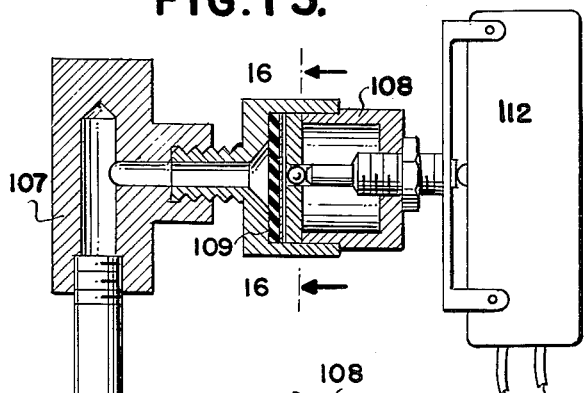
Figure 16:
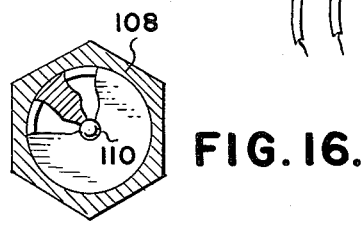
Figure 19:
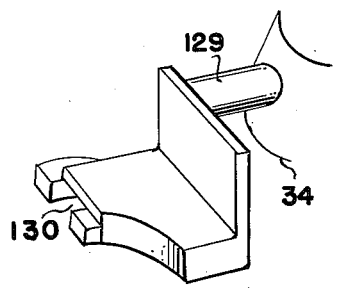
Figure 17:
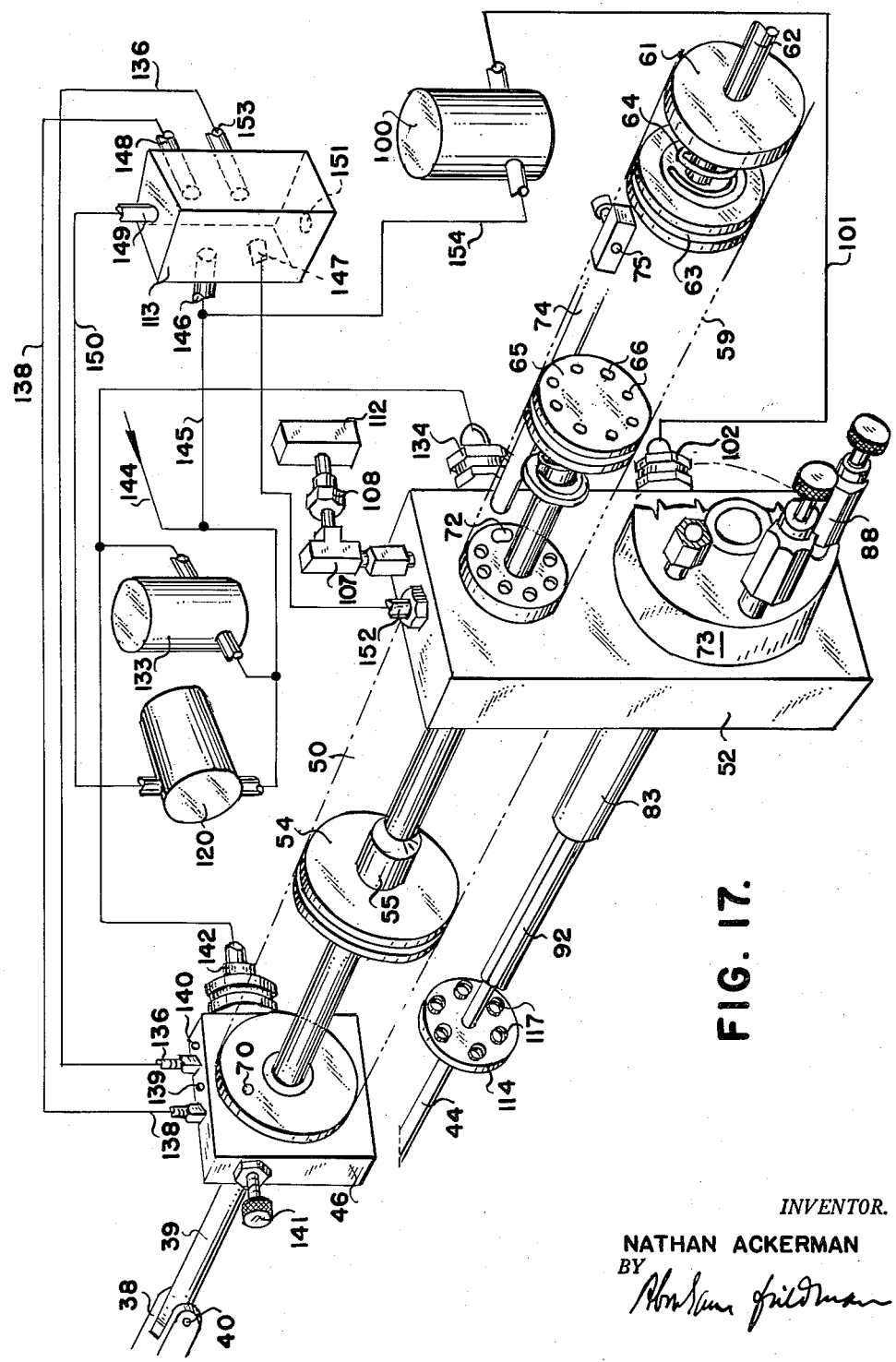

FIGURES 7, 8 and 9 are views taken along lines 7—7, 8—8 and 9—9 respectively, of FIGURE 2;

FIGURE 10 is a view similar to FIGURE 9 with a portion of the distributor plate broken away to show the internal construction thereof;

FIGURE 11 is a section taken along lines 11—11 of FIGURE 9;

FIGURES 12 and 13 are sectional views taken along lines 12—12 and 13—13 respectively, of FIGURE 11;

FIGURE 14 is a top plan view on an enlarged scale of a portion of the structure shown in FIGURE 2 with portions removed to show the internal construction of the oil cylinder;

FIGURE 15 is a vertical section through the pressure switch showing its connection to the micro-switch which is shown in full;

FIGURE 16 is a view taken along lines 16—16 of FIGURE 15;

FIGURE 17 is a perspective view of portions of the novel control mechanism, schematically showing the compressed air lines of flow;

FIGURE 18 is a wiring diagram for the novel control mechanism;

FIGURE 19 is a perspective view of a portion of the turret shown in FIGURE 1 and a cam track carried thereby; and FIGURES 20 and 21 are top plan views of the structural portions of FIGURE 19 in two different operative positions relative to a workpiece.

Referring now more particularly to the drawings, the screw machine shown in FIGURE 1 comprises a collet chuck 30 for holding a workpiece W. The jaws of the chuck can be opened and closed manually by means of lever 31 or can be operated automatically in the manner hereinafter to be described. Upon actuation of the machine, the chuck 30 together with the workpiece W will be rotated about the axis of the workpiece. The bed of the machine also carries a slide member 32 which is longitudinally displaceable towards and away from the workpiece. At its left hand end the slide member 32 is provided with a shaft 33 about which there is rotatably mounted a turret 34 provided with six holders 35, each designed to carry a tool designated 36a, 36b, etc.

The slide member 32 may be displaced manually by means of lever 37 or it may be operated automatically as will be described more fully hereinafter. The internal construction of the slide member 32 is conventional and is so designed that when the slide member 32 reaches its right hand end position, the turret 34 is rotated 60° to present the next tool 36a. The slide member 32 may then be advanced to the left to contact the tool 36a with the rotating workpiece W held by chuck 30, the advance being effected manually by lever 37.

Preferably, however, the advance of slide member 32 is regulated and effected by means of the apparatus shown at the right hand side of FIGURE 1. Specifically, a bifurcated projection 38 is provided on slide member 32 and a piston rod 39 is connected to the projection 38 by pin 40. The piston rod 39 extends through an aperture 41 in a plate 42 which is bolted to the bed of the screw machine (see FIG. 2). With the apparatus so far described it is apparent that the slide member 32 and piston rod 39 are linked for longitudinal movement so that they will move together. Projecting from the right hand end of slide member 32 are six threaded rods 43 and a central shaft 44 aligned so as to be capable of movement through an opening 45 in the plate 42. Each of the rods 43 corresponds to a particular holder 35 of the turret 34, a 60° movement of the turret producing a corresponding 60° rotation of the rods 43 and consequently of shaft 44 of the control unit.

Turning now to FIGURE 2, a block 46 is secured to plate 42 by screws 47 and is provided with grooves 48 aligned with aperture 41, O-ring 49 seating in the grooves and forming an air-tight seal about piston rod 39. The right hand end of block 46 is formed as a circular shoulder to provide a seat for an air cylinder 50, the other end of the cylinder 50 seating about an annular disk 51 which is bolted to a distributor plate 52. The plate 52 and block 46 being held together by several rods (not numbered). The annulus of disc 51 is recessed and provided with a gasket 53.

The piston rod 39 is provided with a piston head 54 for operation within cylinder 50. The rod 39 is further provided with an enlarged collar 55, positioned directly to the right of piston head 54 and of such dimension that it will contact gasket 53 when the piston is removed to the right, the end position of the collar lying in aperture 56 of distributor plate 52. A small annular disc 57 is secured to distributor plate 52 by bolts 58 and is externally threaded to receive an oil cylinder 59. Gaskets 60 surround piston rod 39 and form an oil-tight-seal therewith. The right hand end of cylinder 59 is internally threaded and closed off by plug 61 through the center of which there extends a stub shaft 62, connected to a plunger head 63 within the cylinder 59. A spring 64 urges stub shaft 62 into the cylinder 59 to compensate for any changes in the volume within the cylinder.

The right hand end of piston rod 39 is successively stepped, a second piston head 65 being screwed on to the end of the rod 39 and conforming exactly with the contour of cylinder 59. Piston head 65 is provided with a plurality of apertures 66 closed off by a ring 67, which is urged against the piston head 65 by a spring 68, the spring seating between ring 67 and a further ring 69 on the first shoulder of piston rod 39. In operation, the cylinder 59 is filled with oil and it can be seen that piston head 65 cannot move to the left unless means are provided for circulating the oil. When piston rod 39 together with piston head 65 is moved to the right, however, the pressure of oil within cylinder 59 overcomes the urging of spring 68 and oil within the right hand side of cylinder 59 can pass freely to the left hand side of the cylinder through apertures 66.

Figure 3:
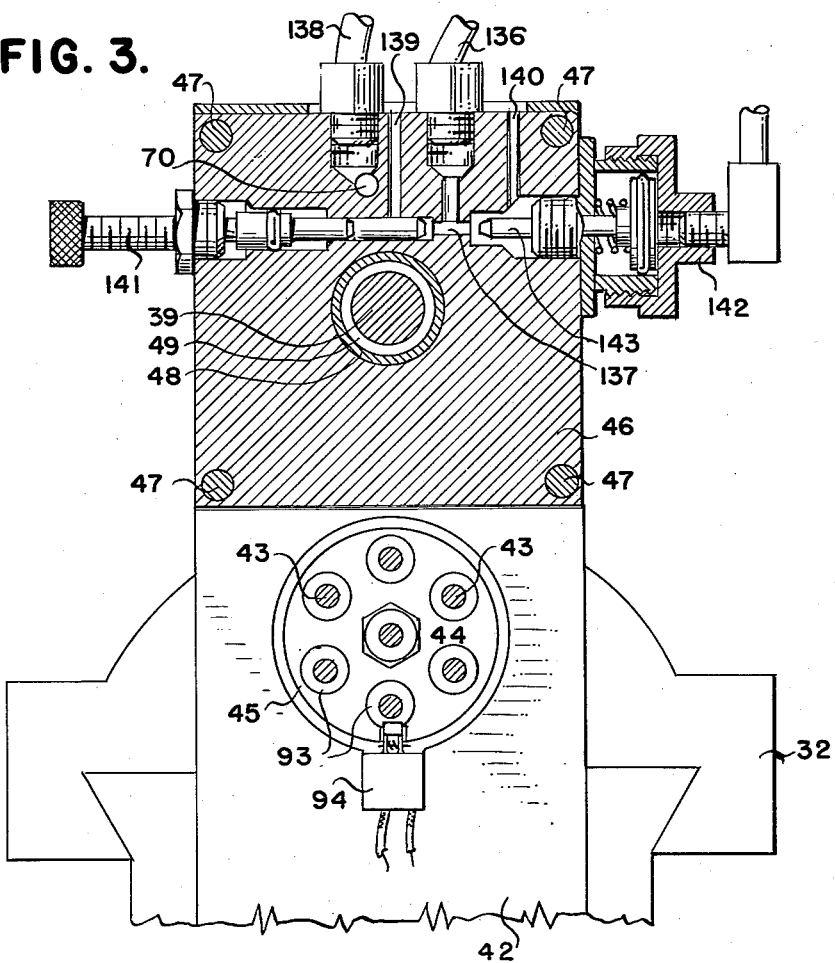
FIGURE 3 is a section taken along lines 3—3 of FIGURE 2.

The air cylinder 50 is provided at its left hand end with an aperture 70 (see FIGURES 3 and 17) for the flow of air whereas the right hand end of the cylinder 50 is provided with an air-passageway by means of aperture 56 in distributor plate 52, aperture 56 communicating with the passageway 71 in plate 52.

The oil within cylinder 59 can flow through an aperture 72 (FIGURES 9 and 10), provided in the distributor plate 52, then through passageway 76, chamber 77 and line 78, back into the upper portion of distributor plate 52 and to a return conduit 74 having a screw locked filling hold and then to the right hand side of the cylinder 59 through port 75.

With the apparatus so far described, compressed air is admitted to the passageway 71 to thereby displace piston head 54 to the left, air being simultaneously vented through aperture 70. The piston head 65 is carried along causing oil to flow from the left hand side of the oil cylinder to the right side. Because of the free flow of oil the pistons move rapidly to the left, carrying the slide member 32 therewith. During the rapid advance phase, when the appropriate tool 36 has almost arrived at its requisite location, adjacent to workpiece W, it is necessary to slow down the advance and this is effected by impeding the flow of oil so that a braking action is effected on the piston rod 39. This braking action is achieved in the following manner:

Referring now to FIGURES 9 to 13, during the rapid advance of the piston rod 39, oil enters the distributor plate 52 through aperture 72 and then passes downwardly through passageway 76 provided within plate 52. The main body of oil flows into chamber 77 and then into line 78, after which it is free to enter conduit 74. A small amount of the oil during movement through passageway 76 enters and flows through passageway 79 provided in plate 52, and enters circular groove 80 in auxiliary ring 73. From the groove 80 oil enters each of the six threaded chambers 81, passes radially through the six passageways 82 and impinges against indexing guide 83, the latter closing off five of the passageways 82. The sixth passageway communicates with a depressed area 84 of guide 83 so that the oil enters peripheral groove 85 defined between the annulus of ring 73 and guide 83. From groove 85 the oil leaves through passageway 86 and re-enters the distributor plate 52 through port 87, from whence it flows into line 78, joining the main body of oil.

The amount of oil following the circuitous path through auxiliary ring 73 is relatively small as compared with the volume of oil flowing directly from passageway 76 to chamber 77 and then into line 78. Moreover, the oil in the secondary path is limited in its flow rate by valves 88 as shown in FIGURE 11. Each valve 88 comprises a body 89, threadedly extending into a respective chamber 81 of auxiliary ring 73. A valve rod 90 is disposed within the body 89 and can be advanced or withdrawn by manipulation of screw head 91. By advancing the rod 90 to the left in FIGURE 11 the flow of oil along the secondary path will be even further restricted. In operation, each of the heads 91 will be adjusted in advance so that the respective valve rods 90 will close off the respective chambers 81 to the desired extent.

It will be noted that only one of the passageways 82 permits the flow of oil to guide 83, the particular passageway 82 being determined by the angular position of depressed area 84. As shown in FIGURE 2, the central shaft 44 extending from slide member 32 at its right hand end is formed as a noncircular rod, e.g., hexagonal rod 92 which extends into and engages a hexagonal annulus in guide 83. Consequently when the turret 34 rotates to bring the next tool 36 into position, central shaft 44 also rotates causing guide 83 to be carried along and thereby aligning depressed area 84 with the next passageway 82. Thus, each passageway 82 corresponds to a given tool on the turret 34 and the position of corresponding valve rod 90 determines the rate of oil flow along the secondary path.

Figure 4:
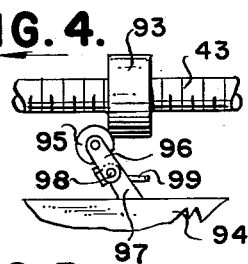
FIGURE 4 is an enlarged view of a portion of FIGURE 2 when the slide member is advancing.
Figure 5:
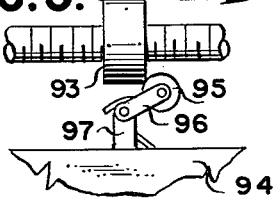
FIGURE 5 is an enlarged view of a portion of FIGURE 2 when the slide member is returning.
Figure 6:
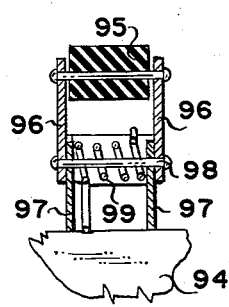
FIGURE 6 is a view of an enlarged scale of the microswitch as seen from the right hand side of FIGURES 4 and 5.

Each of the threaded rods 43 is provided with an internally threaded bushing 93 longitudinally displaceable therealong. As the slide member 32 moves rapidly to the left, carrying rods 43 therewith, the bushing 93 on the lowermost rod 43 contacts a micro-switch 94 positioned adjacent opening 45 in plate 42. As shown in FIGURES 4 to 6, switch 94 includes a roller 95, carried by a pair of arms 96, which are pivoted to a pair of supports 97 by axle 98. A spring 99 is wound about the axle in such manner that upon movement of roller 95 to the left in FIGURE 4 supports 97 are tilted therewith, whereas upon movement of the roller 95 to the right, as shown in FIGURE 5, the supports 97 remain stationary and are not effected.

When bushing 93 moves to the left and tilts supports 97 of micro-switch 94, a 3-way solenoid air valve 100 is actuated so that compressed air is supplied through line 101 (FIGURE 10) thereby acting on valve 102 on distributor plate 52. The compressed air within line 101 displaces diaphragm 103 against the action of spring 104 so that pin 105 is advanced to seal off the entrance to chamber 77. Consequently, all the oil flowing between passageway 76 and line 78 must travel through passageway 79 and along the circuitous path within auxiliary ring 73. The specific rate of this reduced oil flow depends upon the setting of the particular valve rod 90. The diminished oil flow creates a drag on piston head 65 which therefore retards piston rod 39 and slows down the advance of slide member 32. The precise moment at which the slow advance is initiated will depend upon the positioning of the particular bushing 93, each bushing 93 being so disposed that its corresponding tool 36 will be approximately at the desired location of the workpiece W. By means of the electric circuitry shown in FIGURE 18 and described more fully hereinafter, the slow advance will be maintained until the slide member 32 is prevented from further movement by contact of one of the rods 43 with a stop 106 projecting from the machine bed into the slide member 32.

While oil flows through passageway 76 of distributor plate 52, pressure is built up in passageway 76, the pressure being transmitted through fitting 107 to pressure switch 108. The pressure switch 108 includes a displaceable diaphragm 109 acting on a ball 110 which abuts against rod 111. The pressure against diaphragm 109 therefore forces rod 111 to be displaced to the right as seen in FIGURE 15 for actuation of micro-switch 112. Micro-switch 112 through intermediate means hereinafter described controls 4-way air valve 113 which has been supplying air through passageway 71 for advance of piston head 54. When the slide member 32 has reached stop 106, however, piston rod 39 can move no further and the flow of oil within passageway 76 is terminated. As a result diaphragm 109 returns to the left in FIGURE 15 and rod 111 follows therewith, so that micro-switch 112 is opened and valve 113 is shifted to a different operative position. Air no longer enters through passageway 71, but rather is introduced through aperture 70 and exhausted through passageway 71, causing the piston head 54 to move to the right together with piston rod 39 and slide member 32. As the piston rod 39 moves to the right, piston head 65 is carried along within oil cylinder 59, oil passing through apertures 66 by compressing spring 68. Since the oil is not impeded in its flow it is apparent that the return stroke is rapid. During the return stroke central shaft 44 is also carried to the right as viewed in FIGURE 2. A collar 114 is held on central shaft 44 by means of a screw 115 and is provided in its face with six openings 116 for receipt of screws 117. As the central shaft 44 moves to the right carrying along collar 114, one of these screws 117 contacts push button 118 closing micro-switch 119 to actuate 3-way solenoid air valve 120, which then reverses 4-way air valve 113. Consequently, air is again introduced through passageway 71 and the rapid advance is once again initiated.

When the return stroke was initiated, the central shaft 44 as well as threaded rods 43 were rotated through 60° in conventional manner so that collar 114 brought the appropriate screw 117 into alignment with push button 118 and so that the next bushing 93 was positioned for contact with micro-switch 94 during the next advance. Upon completion of the return stroke a rapid advance is again automatically initiated and the cycle is repeated with the next tool 36 in position.

It can be seen that in the event it is desired to stop the machine automatically at the end of a return stroke, this can be effected by eliminating one of the screws 117 so that push button 118 will not be contacted and micro-switch 119 will not be actuated to initiate the next rapid advance. This may be desirable in instances where the operator, following a tapping operation for example, wishes to advance the turret manually.

In place of a longitudinal advance of the tools through movement of the slide member 32, it is possible to effect a transverse movement of a tool for a cutting or similar operation. As seen in FIGURES 20 and 21, the screw machine may be provided on its bed with a transversely extending slide 125, carrying a roller 126 and a tool holder 127 supporting a tool 128. In place of one of the tools 36, the turret 34 is provided with a member 129, having a depressed cam track 130 (FIGURE 19). As the slide member 32 advances to the left as shown in FIGURE 20, the forward end of cam track 130 approaches roller 126. When the roller 126 enters the cam track 130, further movement of slide member 32 to the left causes roller 126 to move along the cam track 130, thereby displacing slide 125 and moving tool 128 transversely to act upon workpiece W, as shown in FIGURE 21. As shown in FIGURE 1, slide 125 rides along a keyway 131 formed in an extension 132 of the machine bed, so that jamming or canting of the slide 125 is not possible. Conveniently, this transverse movement can constitute a cutting as the last operation of a work cycle so that the finished workpiece is automatically severed from a rod or bar of material.

Following completion of such a severing operation, preferably at the end of a work cycle, it will of course be necessary to release chuck 30 to position a further workpiece W. Release of the chuck 30 can be effected automatically by connecting the chuck lever 31 with the 4-way air valve 113 so that at a predetermined part of the cycle the chuck lever 31 will be automatically displaced. The compressed air connection between chuck lever 31 and the compressed air lines are shown schematically in FIGURE 1. A separate air valve may of course be provided to operate the chuck lever.

Upon occasion, it may be desired to stop advance of the slide member 32. This can readily be effected by actuating 3-way solenoid air valve 133 manually so that valve 134 (similar in construction to valve 102), is supplied with compressed air. As a result, line 78 is sealed off by displacement of pin 135, so that oil flow is no longer possible. Without displacement of the oil in front of piston head 65, it is of course impossible to advance piston rod 39 and the slide member 32 is thus stopped.

Upon tapping a hole, it is sometimes found that rapid withdrawal of the tool will serve to form a burr or otherwise mar a workpiece. Upon occasion it is therefore desirable to provide a controlled return of the slide member 32, although this return need not be as carefully controlled as the advance. To this end 4-way air valve 113 is connected by a line 136 with a passageway 137 in block 46 (see FIGURE 3). Aperture 70 which communicates with the interior of the air cylinder 50 is also connected with 4-way air valve 113 by line 138. During the return stroke compressed air is supplied from 4-way air valve 113 to line 138 through aperture 70 and into air cylinder 50, exhaust air leaving the other end of the cylinder through air passageway 71 and being returned to 4-way air valve 113. This exhaust air is led through line 136 to enter passageway 137 which is in communication with lines 139 and 140.

Communication between passageway 137 and line 139 is controlled by manually operated valve 141, while communication between passageway 139 and line 140 is controlled by valve 142 (similar in construction to valves 102 and 134). Valve 142 containing a pin 143 is operated by a 3-way solenoid air valve 133. When valves 141 and 142 are withdrawn as far as possible, the exhaust air within passageway 137 can be freely vented through lines 139 and 140 for rapid return. If line 139 is wholly or partly closed off by valve 141, then displacement of pin 143 to the left by actuation of valve 142 reduces the rate of air flow out of line 139 and thus the piston return is slowed down. It is noted that solenoid air valve 133 controls stopping of the slide member 32 during advance, whereas during the return stroke solenoid air valve 133 serves to slow down the rate of return. This is due to the fact that return of the piston does not depend upon the ability of oil to flow through line 78, since the oil can flow through apertures 68 of piston head 65.

The operating cycle will now be reviewed with reference to the flow of compressed air as best shown in FIGURE 17. Compressed air is introduced at 144 from a suitable source such as a compressor (not shown) and moves along line 145 in the direction shown to enter port 146 of the 4-way air valve 113. The compressed air leaves the valve 113 through one of ports 147 or 148 and returns through the other, the determination of which port serves for entrance and which for exit depending upon whether air is being introduced through port 149 along line 150 from 3-way valve 120.

The internal construction of the valve 113 is conventional and is such that when air enters 149 from valve 120 it depresses a piston. The movement of the piston causes air to flow from port 146 out port 147 during the rapid advance cycle, the air passing along line 152 into passageway 71, then into aperture 56 and into air cylinder 50 to the right of piston head 54 as seen in FIGURE 2. The air piston is thus moved forward, the air leaving from in front of the piston through aperture 70, returning through line 138 and port 148 to valve 113 and being vented to the atmosphere through vent 151.

At the same time oil is being forced by oil piston head 65 through aperture 72, passageway 76, chamber 77, line 78, conduit 74 and port 75 to return behind the oil piston head. The piston 39 is thus advancing rapidly together with the slide member 32 and the turret 34 with tools 36. The threaded rods 43 are also moving rapidly to the left as seen in FIGURE 2.

When the bushing 93 on the lowermost rod 43 contacts roller 95, micro-switch 94 is actuated thereby permitting compressed air flowing from line 145 through line 154 into 3-way valve 100 to leave through line 101 and enter valve 102. Pin 105 of valve 102 is thus advanced (FIGURE 10) to close off chamber 77 so that the oil flow must proceed from passageway 76 through auxiliary ring 73 to enter line 78 through port 87. The angular position of shaft 44 determines the angular position of indexing guide 83 and thus establishes which of valves 88 governs the rate of this secondary oil flow. Since oil can only flow along this secondary circuitous path, the piston head 65 creates a drag or braking action on piston rod 39 so that the turret 34 advances slowly. Even after micro-switch 94 is released by further travel of bushing 93 to the left, a holding circuit, described more fully in connection with FIGURE 18, keeps valve 100 actuated so that the slow advance is continued.

The slow advance continues until the bottommost rod 43 arrives at abutment 106 and the slide member 32 is prevented from further forward movement. As a result, oil flow is terminated. During the flow of oil, pressure was built up in pressure switch 108 thereby actuating micro-switch 112 which kept valve 120 open to continue the flow of compressed air back of the air piston head 54. When oil stops flowing upon contact with abutment 106, the pressure switch 108 releases micro-switch 112 and valve 120 is closed so that air ceases to flow through line 150 into port 149 of valve 113. As a result the piston (not shown) within the valve 113 returns to its normal position and compressed air leaves through port 148 and is returned to the valve 113 through port 147.

Because air leaves valve 113 through port 148 it passes over line 138 through aperture 70 and enters air cylinder 50 to the left of piston head 54 as seen in FIGURE 2, the air to the right of the piston head leaving through passageway 71 and returning to the valve 113 through line 152 and port 147, the exhaust air still being vented to the atmosphere through port 153, line 136, passageway 137 and lines 139 and 140. As a result the piston rod 39 is carried rapidly to the right, oil flowing through apertures 66 in piston head 65.

Upon initiation of the return stroke, the turret 34 rotates 60° causing a corresponding rotation of shaft 44 and threaded rods 43, preparing the indexing guide to register with the next valve 88 during the next forward movement. At the same time the holding circuit for valve 100 is broken preparing it for the next rapid forward movement.

As the piston rod 39 returns together with slide member 32 and central shaft 44, one of the screws 117 on collar 114 contacts push button 118 to actuate micro-switch 119 which again opens valve 120 to depress the piston (not shown) with 4-way valve 113. As a result the flow of air is again reversed and the next rapid advance is initiated. It is noted that once the forward movement is initiated micro-switch 119 is no longer actuated, however, a relay circuit, hereinafter to be described, is actuated and keeps valve 120 open until pressure switch 108 is actuated and takes over.

The slide member 32 will continue advancing and returning automatically. If it is desired to stop the machine automatically at the end of a six-operation cycle this can be accomplished by removing one of the screws 117 so that micro-switch 119 will not act to open valve 120 and thus the next forward movement will not be initiated. If it is desired to stop the machine when it reaches its forwardmost position it is merely necessary to cut out pressure switch 108 and micro-switch 112 since these act upon valve 120 to control reversal valve 113 for initiation of the return movement.

Each successive advance will be performed with a different tool 36 in operative position on turret 34. At the end of the cycle after the sixth operation has been completed compressed air from valve 113 can be employed to automatically open chuck 30 to prepare it for receipt of another workpiece W. In such event it is advantageous that the last screw 117 be omitted so that the machine will stop to permit insertion of the workpiece at the end of the cycle.

Should the machine operator desire to stop the machine at any stage during the advance or should he desire to control the rate of return, this can be effected by actuating valve 133. During advance this prevents circulation of oil due to actuation of valve 134 and thus completely stops the machine. During return, this controls the rate at which the exhaust air can be vented to the atmosphere due to operation of valve 142 and thus slows down the rate of return.

Turning now to FIGURE 18, the circuitry includes two leads 155, 156 leading to a suitable source of electric current. A master switch 157 controls the basic circuit and is used to actuate or inactuate the machine. Displaceable contact 159 of a three-position switch 158 is pre-set on one of contacts 160, 161 or 162. Contact 160 serves to hold the turret in its most advanced position thereby preventing return; contact 162 serves to stop the forward motion or control the rate of return; contact 161 controls automatic operation of the machine. Assuming that the contact 161 is engaged by contact 159, if the machine has previously been stopped in its end position micro-switch 119 will be closed. The solenoid of 3-way air valve 120 will thereby be energized to initiate advance of the piston rod 39. At the same time current will flow through member 163 and through back contact 164, relay 165 and back to the lead 155. Member 166 will thus be attracted to front contact 167. When micro-switch 119 is no longer closed due to initiation of advance with consequent disengagement of screw 117 from push button 118, current will flow from lead 156 through line 168 to member 166, through front contact 167, line 169 and solenoid valve 120 to lead 155 to continue the forward movement of the piston rod 39. At the same time current from line 169 will flow through member 163 and back contact 164 to keep relay 165 actuated so that member 166 is maintained in its elevated position.

When bushing 93 actuates the next micro-switch 94 due to continued forward travel of piston rod 39, the solenoid valve 100 is energized along lines 170, 171 and 172 to force the oil to follow the circuitous path and thus slow down the rate of advance. At the same time current flows through line 170 and through relay 173 to thereby attract member 163 to front contact 174. The holding circuit of relay 165 is thus broken so that it no longer serves to maintain solenoid valve 120 in energized state. However, valve 120 is kept energized by the circuit through 170, 171, 175, 174 and 163. The pressure immediately begins to build up in the oil lines and micro-switch 112 is closed, the micro-switch 112 and line 176 then take over the functions of micro-switch 94 and lines 170, 171 so that the solenoid valves 100 and 120 are still energized.

When the slide member reaches its forwardmost position, pressure in the oil line drops and micro-switch 112 is opened so that solenoid valve 120 is deenergized. At the same time relay 173 is deenergized so member 163 drops and solenoid valve 100 is simultaneously deenergized, restoring the initial condition. Due to deenergizing of valve 120, the air flow is in the opposite direction and the piston rod is carried back until the micro-switch 119 is closed to repeat the operation.

Upon removal of one of screws 117 the plunger 118 will not be actuated at the end of the return stroke. Consequently, the slide will come to a halt at the end of said return stroke. In order to initiate the next advance stroke of the slide, displaceable contact 159 is manually moved momentarily to contact 160. This results in shunting across the open contacts of switch 119. If movable contact 159 is retained on contact 160, the slide will come to a halt at the end of its advance stroke and remain stationary there. To cause the slide to initiate its next return stroke, contact 159 is moved to contact 161 and the machine resumes its automatic operation. On the other hand if the displaceable contact 159 is moved to contact 162 it will energize solenoid valve 133 and thus will stop all movement if the forward portion of the operation is involved or it will effect a controlled return. Here, too, the next rapid advance will not be automatically initiated although this can be achieved through appropriate wiring additions, if desired.

A timer T, which may advantageously be an electric clock mechanism provided with a sweep second hand, is provided and connected in parallel with solenoid coil 100. Since solenoid coil 100 receives current during the period of time when the forward movement of the slide is in restrained condition so that it moves at a reduced speed while the tool is in operational contact with the workpiece, the timer will indicate the period of such operation. In many cases the machining period for the combination of the particular tool piece with the material being machined, is known. In such cases the operator need only adjust the appropriate adjustable valve for that particular index position by reference to the elapsed time indicated by the timer. By use of the timer the operator may keep a record of the machining time for each tool and an entire job may then be readily re-set by merely setting the valves for the appropriate timing period in accordance with the timer readings.

In review, therefore, the invention involves control of a screw machine by appropriate braking of the rapid advance of the tools when they approach the workpiece, each tool being separately braked at a different speed. This is achieved by individual control of the circulation rate of oil within a cylinder arranged in tandem with an air cylinder, each cylinder including its own piston. The air piston is the prime mover and appropriate air flow is maintained by a solenoid air valve which is separately controlled during the rapid and slow advances, the solenoid air valve during the slow advance being controlled by at least one pressure responsive switch. By regulation of the rate of venting of the exhaust air it is also possible to control the rate of return.

While one specific embodiment has been shown it is apparent that various changes and modifications can be made without departing from the spirit and scope of the present invention and it is intended that such obvious changes and modifications be embraced by the annexed claims.

I claim:

1. A reciprocating device comprising an air cylinder and a fluid cylinder in axial alignment therewith, a piston rod disposed within said cylinders, a pair of piston heads carried by said piston rod, one of said piston heads being disposed in said air cylinder, the other piston head being disposed within said fluid cylinder, air pressure means associated with said air cylinder for reciprocably moving said piston rod at a relatively rapid rate, fluid control means associated with said fluid cylinder for selectively restraining the movement of the piston rod as it moves in one direction to a predetermined lower rate and to permit the unrestrained return movement thereof in the reverse direction, said fluid control means including a fluid return conduit in communication with each end of said fluid cylinder for permitting the unrestricted return flow of fluid displaced by the movement of said other piston head in said one direction to the opposing end of said fluid cylinder whereby said piston may be unrestrainedly moved in said fluid cylinder in said one direction and selectively operable valve means for diverting said return fluid flow through a restricted path to thereby restrain the movement of said piston in said fluid cylinder in said one direction, and additional means associated with said other piston head to permit the flow of fluid therethrough during the return movement thereof whereby said fluid presents no material restraint to the return movement of said other piston, said additional means comprising a ring surrounding said piston rod disposed in contiguity with the face of said other piston head which trails during the return movement thereof, said other piston head being provided with a plurality of circumferentially spaced axially extending perforations therethrough, a resilient element secured to said piston rod urging said ring into sealing engagement with the trailing face of said other piston head, said resilient element being adapted to yield under the pressure of said fluid against said ring during the return movement of said piston rod, whereby said fluid may flow through the perforations in said piston head.

2. A reciprocating mechanism comprising an air cylinder and fluid cylinder in axial alignment therewith, a piston rod disposed within said cylinders, a pair of piston heads carried by said rod, one of said piston heads being disposed in said air cylinder, the other piston head being disposed within said fluid cylinder, air pressure means associated with said air cylinder for reciprocably moving said piston rod at a relatively rapid rate, fluid control means associated with said fluid cylinder for selectively restraining the movement of the piston rod to a predetermined lower rate and to permit the unrestrained movement thereof, said fluid control means including a return conduit in communication with each end of said fluid cylinder for permitting the unrestricted return flow of the fluid in said cylinder which is displaced by the advancing movement of the piston head therein to the opposing end of said fluid cylinder whereby said piston may unrestrainedly be advanced in said fluid cylinder and selectively operable valve means for diverting said return fluid flow through a circuitous restricted path to thereby restrain the advancing movement of the piston within the fluid cylinder, said circuitous restricted path including adjustable valve means for metering the fluid flow therethrough in accordance with the adjustment thereof to thereby determine the degree of restraint to which the piston within said fluid cylinder is subjected during the advancing movement thereof to thereby determine the rate of advance thereof, said adjustable valve means including a plurality of valves, each of which is associated with a successive cycle of said mechanism, each of said valves being independently adjustable to provide a desired degree of restriction for said circuitous path effective to produce a desired degree of restraint in the rate of the advancing movement of said piston rod.

3. A reciprocating mechanism comprising an air cylinder and fluid cylinder in axial alignment therewith, a piston rod disposed within said cylinders, a pair of piston heads carried by said rod, one of said piston heads being disposed in said air cylinder, the other piston head being disposed within said fluid cylinder, air pressure means associated with said air cylinder for reciprocably moving said piston rod at a relatively rapid rate, fluid control means associated with said fluid cylinder for selectively restraining the movement of the piston rod as it advances to a predetermined lower rate and to permit the unrestrained movement thereof, said fluid control means including a return conduit in communication with each end of said fluid cylinder for permitting the unrestricted return flow of the fluid in said cylinder which is displaced by the advancing movement of the piston head therein to the opposing end of said fluid cylinder whereby said piston may unrestrainedly be advanced in said fluid cylinder and selectively operable valve means for diverting said return fluid flow through a circuitous restricted path to thereby restrain the advancing movement of the piston within the fluid cylinder, said circuitous path including a distributor plate, an auxiliary ring mounted on said distributor plate, said auxiliary ring being provided with a circular groove, conduit means for said fluid extending through said distributor plate and in communication with said auxiliary groove, a plurality of radially extending passageways in communication with said circular groove, a valve disposed at the juncture of said circular groove with each of said radially extending passageways, each of said valves being independently adjustable for metering the fluid flow between said circular groove and the passageway with which said valve is associated in accordance with the adjustment thereof, an indexing guide rotatably disposed within the annulus of said auxiliary ring, said indexing guide being in sealing contact with the circumferential peripheral surface of said annulus, a depressed area formed in the peripheral surface of said indexing guide, and a peripheral groove formed in said indexing guide in communication with said depressed area, an additional passageway provided in said ring in communication with a return passageway provided in said distributor plate, said return passageway being in ultimate communication with said return conduit, the depressed area in said indexing guide being disposed so as to overlie the opening of only one of said radially extending passageways and said peripheral groove being disposed to overlie the opening of said return passageway at the annulus of said auxiliary ring, whereby a fluid path is provided from one of said radially extending passageways through said depressed area and peripheral groove into said additional passageway, said indexing guide being advanced during each cyclical reciprocation of said mechanism so that said depressed area is brought into registration with a corresponding successive radially extending passageway in the distributor ring whereby fluid flow through said circuitous path is possible through said successive radial passageway only and is subjected to the metering action of the adjustable valve associated therewith.

4. A reciprocating mechanism comprising a reciprocating member, motive means to effect the movement of said reciprocating member and means to control said motive means, said control means including a hydraulic cylinder and a piston therefor for movement corresponding to the movement of said reciprocating member, a closed hydraulic circuit between the opposite ends of said cylinder, means for restricting the circulation of fluid through said circuit during a control period, whereby fluid pressure is developed in said cylinder during the movement of said reciprocating member and the corresponding movement of said piston and whereby said pressure drops as said reciprocating member and piston are brought to a halt by abutment with a stop, and a hydraulic pressure operated control device in communication with said cylinder whereby the pressure developed within said cylinder by the movement of the piston therethrough actuates said control device into one condition and the pressure drop resulting from the stoppage of the movement of the piston within said cylinder actuates said control device into another condition.

5. A reversible driving means, a hydraulic cylinder, a piston in said cylinder driven by said driving means, a closed circuit restrictively connecting the opposite ends of said cylinder, hydraulic fluid completely filling said cylinder and closed circuit whereby when the piston is moved pressure is developed in the fluid, and a pressure sensitive means responsive to the pressure of the fluid for determining the direction of movement of the reversible means and operable to reverse the direction of movement of said reversible means upon restraint of movement of said means which stops movement of the piston in the cylinder and thereby drops the pressure of said fluid.

6. A reversible driving means, a hydraulic cylinder, a piston in said cylinder driven by said driving means, a closed circuit connecting the opposite ends of said cylinder, hydraulic fluid completely filling said cylinder and closed circuit, said closed circuit including a primary path providing for comparatively unrestrained oil flow between the ends of said cylinder, and a secondary path between said ends of the cylinder, means for selectively rendering one of said paths effective, said secondary path including a plurality of adjustable metering means, and means for selectively excluding all but one of said metering means from said secondary path at any one time.

(References on following page)

References Cited in the file of this patent

UNITED STATES PATENTS

| | | |
|---|---|---|
| 638,020 | Ecker | Nov. 28, 1899 |
| 897,676 | Thompson | Sept. 1, 1908 |
| 971,143 | Randall | Sept. 27, 1910 |
| 1,998,873 | Kingsbury | Apr. 23, 1935 |
| 2,306,379 | Conradson | Dec. 29, 1942 |
| 2,326,498 | Rodal | Aug. 10, 1943 |
| 2,470,415 | Seborg | May 17, 1949 |
| 2,515,531 | Seborg | July 18, 1950 |
| 2,527,458 | Schurr | Oct. 24, 1950 |
| 2,536,175 | Hansen | Jan. 2, 1951 |
| 2,579,566 | Godfriaux | Dec. 25, 1951 |
| 2,627,646 | Perry | Feb. 10, 1953 |
| 2,642,649 | Shadrick | June 23, 1953 |
| 2,680,281 | Montgomery | June 8, 1954 |
| 2,691,962 | Johnson | Oct. 19, 1954 |

FOREIGN PATENTS

| | | |
|---|---|---|
| 608,814 | Great Britain | Sept. 21, 1948 |